Sept. 29, 1942.   W. C. NODDINGS   2,297,578
AUTOMATIC CONSTANT CURRENT CONTROLLER
Filed Aug. 2, 1940
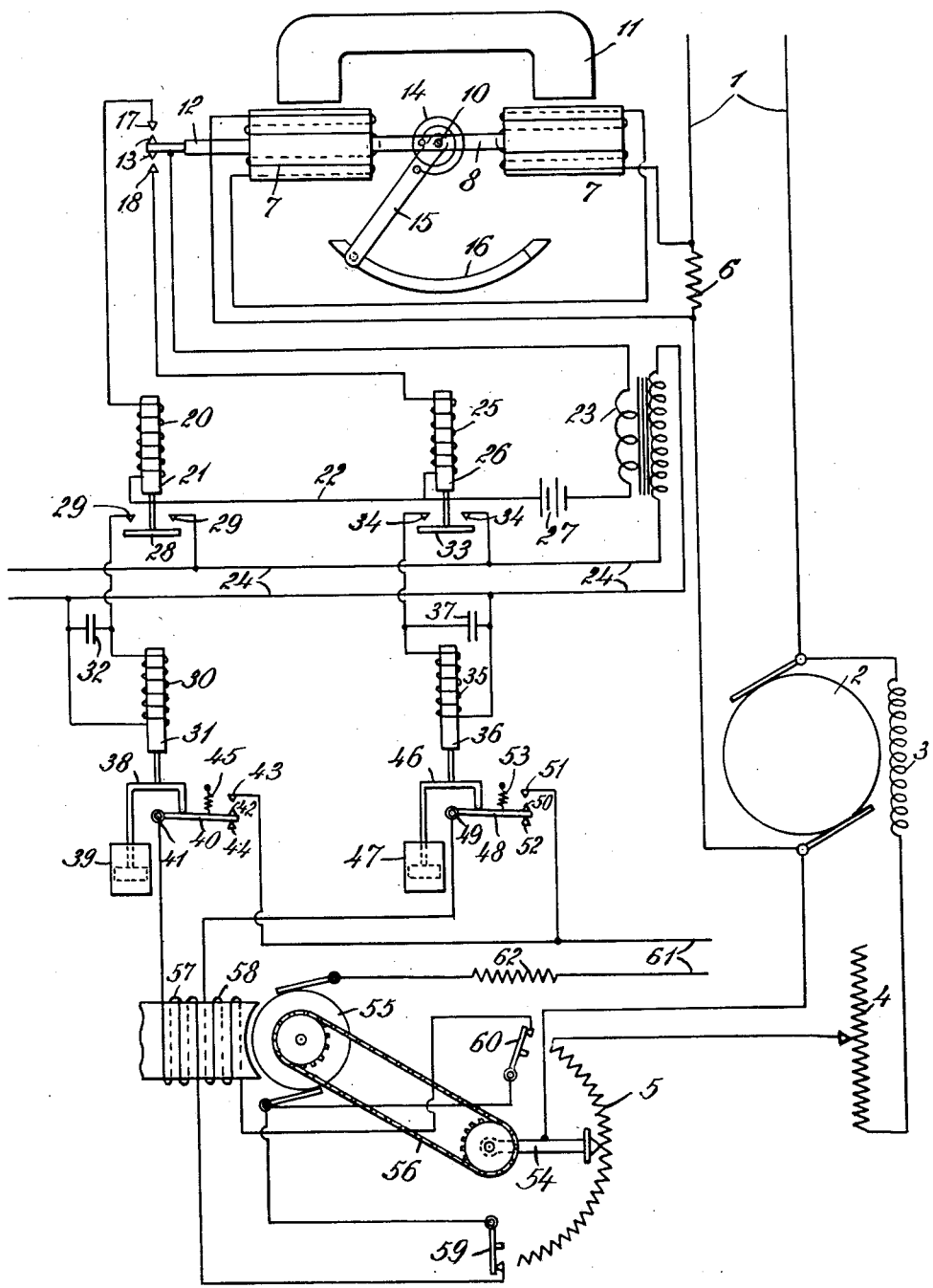
INVENTOR
William C. Noddings
BY
Rennie, Davis, Marvin and Edmonds
ATTORNEYS Patented Sept. 29, 1942

2,297,578

UNITED STATES PATENT OFFICE 2,297,578

AUTOMATIC CONSTANT CURRENT CONTROLLER

William Clayton Noddings, Matawan, N. J., assignor to International Smelting & Refining Co., New York, N. Y., a corporation of Montana Application August 2, 1940, Serial No. 349,832

3 Claims. (Cl. 171—229)

This invention relates to automatic constant current controllers and, more particularly, to a current regulating system for maintaining a substantially constant predetermined current in the current output circuit of a direct-current generator.

In many electrolytic processes involving the use of direct current, such as in various electroplating operations and in the electrolytic production of metal salts, it is often important to maintain a substantially constant current in order to obtain uniform products of high quality. This is particularly true in processes for the production of sheet metal such as sheet copper by electroplating the metal onto a rotating drum cathode. The cathode, partially immersed in an electrolyte, rotates at a constant speed, and any material fluctuation in the current supplied to the apparatus on which such metal sheets are produced affects the rate of metal deposition on the cathode and so affects the thickness of the sheet. Naturally it is important that the thickness of the sheet be maintained within close limits.

Not infrequently plants having a number of electrolytic units in operation must shut down one or more units for the purpose of making repairs or to make adjustments in the process being carried out. If all units, or any considerable group of units, in such a plant are supplied from a single generator, the shutting down or starting up of one unit will affect the amount of current supplied to other units unless the current output of the generator is adjusted to meet the altered conditions. Furthermore, changes in operating conditions normally occurring during operation of an electrolytic plant often result in the imposition of a change in the current output required of the generator.

In current regulating systems proposed heretofore, the method of control generally employed involves varying the resistance of the field circuit of the generator by means of a rheostat operated by a series-wound electric motor having two independent opposing field windings energized alternatively in response to an increase or a decrease in current from a predetermined desirable value in the output circuit of the generator. Rapid variations and light uncertain variations in the current flowing through the generator output circuit are manifested in the conventional current regulating devices heretofore proposed by corresponding jerkiness and rapid variations in the direction in which the electric control motor rotates. This attempted rapid variation and uncertainty in the direction of the control motor rotation materially lowers, by "hunting" and jerky operation, the effectiveness of the motor in maintaining the desired constant current flow in the generator output circuit.

I have devised a novel automatic current regulating system of the character described which provides smooth and uniform operation of the control motor substantially free from the above-mentioned disadvantageous effect of rapid or light uncertain variations imparted to the control motor in response to the current flowing through the generator output circuit. Briefly, the invention provides an improvement in a current regulating system for maintaining a substantially constant predetermined current in the output circuit of a direct-current generator having a variable rheostat in series in the generator field circuit, and an electric series-wound motor adapted to operate the variable rheostat and provided with two opposing independent series field windings. The improvement of my invention comprises a combination of elements including a current regulating relay comprising a contact arm pivotally mounted for movement between two spaced contact points in response to variations in the current flowing through the generator output circuit, and means for adjusting the position of the contact arm intermediate, and out of contact with, the contact points at a predetermined constant current flowing through the generator output circuit. Two sensitive relays are provided for being alternatively energized by contact between the contact arm and one or the other of the contact points in response to a variation in the current flow through the generator output circuit. Two delayed-break relays are provided, each capable of effecting energization of one of the two independent motor field windings in response to energization of one of the sensitive relays. Each of the delayed-break relays is of such design as to have a delayed break of sufficient magnitude to maintain energization of each of the motor field windings for a longer period of time than the energization of the corresponding sensitive relay.

In accordance with my invention, a light but uncertain contact made between the contact arm and one of the contact points as the contact arm oscillates in and out of contact with this contact point effects a correspondingly frequent energization of one of the sensitive relays. This sensitive relay effects energization of one of the delayed-break relays which in turn effects energization of one of the two independent motor field windings and motor armature with consequent corrective adjustment of the current in the generator output circuit. As a result of the delayed break characteristic of the delayed-break relay, the corresponding motor field winding and motor armature remains energized in spite of rapid making and breaking of electrical contact between the contact arm and the above-mentioned contact point.

The sensitive relays are energized from a source of alternating current in series with a source of direct current of sufficient magnitude to inhibit improper operation, such as vibration, of the relay in response to alternations of the alternating potential. The coil of each delayed-break relay is energized by the establishment of an electrical contact in a circuit including this coil by energization of one of the sensitive relays, and a condenser is connected advantageously in parallel with the coil of each delayed-break relay in order (when the coil is energized by alternating current) to minimize arcing during breaking of the electrical contact in the delayed-break relay coil circuit when the sensitive relay becomes de-energized. If direct current is used to energize the delayed-break relay, this condenser serves to delay the relay in breaking the circuit which it controls.

The current regulating relay in its preferred form, in accordance with my invention, comprises a contact arm pivotally mounted for arcuate movement in response to variations in the current flowing through the output circuit of the direct-current generator. Two spaced contact points are provided adjacent one end of the contact arm and limit the arcuate movement of the contact arm. An adjustable torsion spring is connected at one end thereof to the contact arm in such a manner as to resist arcuate movement of the contact arm with increasing current flow through the generator output circuit. Means to which the other end of the torsion spring is connected are provided for adjusting the tension of the torsion spring so as to adjust the position of the contact arm intermediate the spaced contact points at any predetermined constant current flow through the generator output circuit.

Further details of the current regulating system of my invention will be seen by reference to the drawing, in which the single figure shows diagrammatically the various elements of the current regulating system.

As shown in the drawing, the automatic constant current controller is adapted to maintain a substantially constant predetermined current in the output circuit 1 of a direct current generator 2 provided with a shunt field 3 in series with a main field rheostat 4 capable of being manually adjusted to obtain the desired current flow through the output circuit 1 of the generator. The shunt field 3 and the main field rheostat 4 are also connected in series with an auxiliary field rheostat 5. A change in the setting of the auxiliary rheostat 5 will effect a corresponding change in the field circuit of the generator, thereby materially altering the current flow through the generator output circuit 1. I have found that an auxiliary field rheostat having a range capable of effecting about a 20% variation above and below the desired output current of the generator is satisfactory for most electrolytic plant purposes, although a greater or smaller range may be advantageous depending upon the type of process wherein this constant current controller is used.

The current regulating relay is connected across a suitable shunt 6 such, for example, as a 50 mv. shunt, disposed in the generator output circuit 1. The current regulating relay, which is of the balanced type, comprises current coils 7 connected in series across the shunt 6 and mounted on an arm 8 adapted to rotate about a pivot point 10. The tendency of the coils to rotate about the pivot point 10 is produced as in conventional recording ammeter construction by the reaction between the current flowing through coils 7 and the poles of a permanent magnet 11 shown diagrammatically in the drawing. An extension arm 12 of the pivoted arm 8 is provided with double contact points 13. The tendency of the contact arm 12 to rotate due to the torque created by an increasing current flow through the generator output circuit 1 is resisted by a torsion or coil spring 14 connected at one end thereof to the pivoted arm 8 and connected at the other end thereof to an adjusting arm 15 frictionally mounted about substantially the same axis as the contact arm 8. By moving the adjusting arm 15 along a scale 16, the tension of the torsion spring may be suitably adjusted to balance the torque created by any desired current flowing through the generator output circuit so as to adjust the position of the contact arm 12 intermediate spaced contact points 17 and 18, which limit the rotary or arcuate movement of the contact arm 12, when the desired current flows through the generator output circuit.

One contact point 17 is connected to one terminal of the solenoid coil 20 of a sensitive relay 21. The other terminal of the solenoid coil 20 is connected by a line 22 to the secondary coil 23 of a transformer capable of reducing the voltage across supply line 24 (say, 110 volts) to the desired voltage for energizing the relay coils. An alternating current potential of about 4 volts has been found to be satisfactory for operation of the sensitive relay, this low voltage minimizing burning out of the contact points on contact arm 12 and the spaced contact points 17 and 18. The secondary coil 23 is connected in series to the contact arm 12 so that by contact between contact point 13 of contact arm 12 and contact point 17, a circuit is closed between the solenoid coil 20 and the transformer secondary coil 23.

One terminal of the solenoid coil 25 of a second sensitive relay 26 is similarly connected to the contact point 18, and the other terminal of the coil 25 is connected to line 22, so that by contact between contact point 13 of the contact arm 12 and the contact point 18 a circuit is closed between the solenoid coil 25 and the transformer secondary coil 23.

A source of direct current potential, such as a battery 27, advantageously is interposed in line 22 to supplement the alternating current potential delivered by the transformer secondary coil 23 across each of solenoid coils 20 and 25. The battery 27 is provided with a potential of sufficient magnitude, advantageously about 1–1.5 volts, to inhibit improper operation (such as vibration) of the sensitive relays 21 and 26 when their respective solenoid coils 20 and 25 are energized by the alternating potential from the transformer coil 23.

The sensitive relays 21 and 26 may be the plunger type, shown by way of example in the drawing, having a plunger moving within the solenoid coils 20 and 25, respectively, the plunger being drawn up into the solenoid as each relay is energized and dropping down through the solenoid coils when the sensitive relays are de-energized. The sensitive relays 21 and 26 may with advantage have a slight time delay in the plunger dropping down through the solenoid coil, a dropping out time up to about one-half second being particularly advantageous although not strictly necessary for proper operation of my current regulating system. Other sensitive relays, such as the direct (or alternating) current "clapper-type" relays, may also be used with advantage.

The lower end of the plunger of the sensitive relay 21 is provided with a contact arm 28. When the plunger of sensitive relay 21 moves upwardly upon energization of the relay, the contact arm 28 makes contact between contact points 29 thus completing an electric circuit between the supply line 24 and the solenoid coil 30 of a delayed-break relay 31. A condenser 32 is connected in parallel with the solenoid coil 30 in order to minimize arcing during breaking of the electrical contact between the contact arm 28 and the contact points 29 in the delayed-break relay coil circuit when the delayed-break relay coil 30 is energized by alternating current.

The plunger of the sensitive relay 26 is similarly provided with a contact arm 33 which, when the plunger is drawn up into the solenoid coil 25 upon energization thereof, makes contact between contact points 34, thus completing an electric circuit in which the solenoid coil 35 of a delayed-break relay 36 is connected across the supply line 24. Relay 26, as in the case of relay 21, may comprise any other suitable form of sensitive relay such, for example, as a "clapper-type" relay operated by direct (or alternating) current. A condenser 37 is connected in parallel with the coil 35 in order to minimize arcing when the electrical contact between the contact arm 33 and the contact points 34 is broken in the delayed-break relay coil circuit when the delayed-break relay coil is energized by alternating current.

When direct current-operated relays are used in place of the alternating current-operated relays 31 and 36, the condensers 32 and 37 serve to impart delay-break characteristics to such direct current-operated relays.

The delayed-break relay 31 may be of the plunger type pulling upwardly into the solenoid coil 30 when the latter is energized. The lower end of the plunger of this relay is provided with a substantially U-shaped arm 38 one leg of which is connected to a dash-pot 39 adapted to retard vertical downward motion of the arm 38 in a known manner. The other leg of the U-shaped arm 38 bears against a pivoted contact arm 40 pivoted about point 41 at one end thereof. The other end of the pivoted contact arm 40 is provided with a contact point 42 adapted to make contact with a contact point 43 when the contact arm 40 is moved upwardly. A suitable stop 44 is provided for limiting the space between contact points 42 and 43 when the contact arm is held down by the weight of the plunger of the delayed-break relay 31 imposed upon the contact arm 40 by one leg of the U-shaped arm 38. A tension spring 45 is provided to exert an upward force on the contact arm 40 of sufficient magnitude partially to counter-balance the weight of the U-shaped arm 38 on the contact arm 40 and thus permit the contact points 42 and 43 to be closed quickly when the relay coil 30 is energized.

The delayed-break relay 36 may also be of the plunger type and is provided with a substantially U-shaped arm 46, one leg of which is connected to a dash-pot 47 and the other leg of which presses downwardly against the contact arm 48 pivoted about point 49 at one end thereof. The pivoted contact arm 48 is provided adjacent its other end with a suitable contact point 50 adapted to make contact with the spaced contact point 51. A suitable stop 52 is provided for limiting the downward movement of the pivoted contact arm 48 and a tension spring 53 is provided to exert an upward pull against the pivoted contact arm 48 in a manner such as partially to counter-balance the weight of the U-shaped arm 46 and thus permit the contact points 50 and 51 to be closed quickly when the relay coil 35 is energized.

The delayed-break relays 31 and 36 may be of any other suitable type such, for example, as the "clapper-type" relay operated by direct current. It is merely important that such relays be capable of closing contacts 42 and 43 and contacts 50 and 51 quickly when the relays are energized and be capable of effecting a delayed break of these contacts of about one-half second or more. This delayed-breaking action may be provided in the case of direct current-operated relays by the condensers 32 and 37 each connected in parallel with each of the delayed-break relays 31 and 36.

The sliding arm 54 of the auxiliary field rheostat 5 is operated by an electric motor 55 which drives the sliding arm 54 in any suitable manner such, for example, as by a chain drive 56. The motor 55 is provided with two independent field windings 57 and 58 each connected in series through limit switches 59 and 60 with the armature of the motor 55. The two independent field windings are wound in opposite directions so as to oppose one another if both windings are simultaneously energized, or to drive the motor 55 in opposite directions when these coils 57 and 58 are energized alternatively. The series circuit including the motor armature, the limit switch 59, and the field coil 57 is completed across a motor power supply line 61 by the closing of contacts 42 and 43 upon energization of the delayed-break relay 31. The series circuit including the motor armature, limit switch 60, and the field winding 58 is completed across the supply line 61 by the closing of contacts 50 and 51 upon energization of the delayed-break relay 36. A stalling resistance 62 is connected in series with the motor armature connected to the supply line 61 in order to limit the current flowing through the motor to a tolerable value when and if both of the series field windings 57 and 58 are simultaneously energized. The limit switches 59 and 60 serve to stop the motor 55 when the sliding arm 54 of the auxiliary field rheostat reaches either extreme limit of the rheostat 5.

The operation of the constant current controller will be readily apparent. The adjusting arm 15 of the current regulating relay is moved along the scale 16 until the tension on the torsion spring 14 is such as equal the torque created by the desired current flowing though the generator output circuit 1, thus adjusting the position of the contact arm 12 and its contact points 13 substantially intermediate and out of contact with the spaced contact points 17 and 18 at this desired constant current flow through the generator output circuit. The manually operated main field rheostat 4 is then adjusted so that the desired current flows through the generator output circuit 1 when the sliding arm 54 of the auxiliary field rheostat is at a central position as indicated on the drawing. When the current flowing through the generator output circuit 1 varies from the adjusted desired value, the contact arm 12 makes contact with either of the contact points 17 or 18. Assuming contact between the contact arm 12 and the spaced contact point 17, the sensitive relay 21 is energized, thus raising the contact arm 28 to make contact with the spaced contact points 29. This contact effects energization of the delayed-break relay 31 which raises the U-shaped arm 38 and makes contact between the contact points 42 and 43. The making of contact between the contact points 42 and 43 energizes the motor series winding 57 and connects the motor 55 across its supply line, thus driving the sliding arm 54 of the auxiliary field rheostat 5 in a direction such as to re-establish the desired current flowing through the generator output circuit 1. A similar operation is effected when the contact arm 12 and the spaced contact point 18 energize the sensitive relay 26 and its corresponding delayed-break relay 36, with consequent energization of the series field coil 58 and operation of the control motor 55.

In accordance with my novel current regulating system, an irregularly repeated and uncertain or light contact between the contact arm 12 and either one of the spaced contact points 17 and 18 results in the immediate energization of the sensitive relays 21 and 26. Energization of either of these sensitive relays effects energization of the corresponding delayed-break relay (31 or 36). The delayed-break relay 31, for example, having a delayed breaking action, maintains contact between the contact points 42 and 43 even though a discontinuous and irregular contact is maintained between the contact arm 12 and the spaced contact point 17. The effect of this ironing-out of fluctuating contact between the contact arm 12 and the spaced contact point 17 maintains constant and uniform energization of the series field winding 57, thus freeing the motor from most of the jerky action due to the fluctuating contact between contact arm 12 and the spaced contact point 17. Similar operation is obtained by contact between the contact arm 12 and the spaced contact point 18 operating the sensitive relay 26 and its corresponding delayed-break relay 36 and the series field winding 58.

Fluctuation of the contact arm 12 between both of the spaced contact points 17 and 18 making contact alternatively with these contact points represents variations in the current flowing through the generator output circuit 1 above and below the desired current output with an effective mean current flow of the desired value. This operation effects energization of both of the field windings 57 and 58 with resulting stalling of the motor 55 without the motor "hunting" or overtravelling. The stalling resistance 62 prevents the establishment of an excessive current through the motor 55 under these conditions.

It will be seen therefore, that the constant current controller of my invention maintains a substantially constant predetermined current in the output circuit of a direct-current generator. This constant current controller irons out fluctuations in the current flowing through the generator output circuit with the result that the motor which operates the auxiliary current-adjusting rheostat for the generator operates smoothly and uniformly without the jerky action of "hunting" and without overtravelling and operates substantially free from the effect of rapid variations about the desired current value in the current flow through the generator output circuit. The constant current controller of my invention uses standard electrical equipment of sturdy design with resulting economy and dependability of operation, and with a degree of current control sensitivity and uniformity not heretofore obtainable with conventional constant current controllers.

I claim:

1. In a current regulating system for maintaining a substantially constant predetermined current in the output circuit of a direct-current generator comprising a variable rheostat in series in the generator field circuit, and an electric series-wound motor adapted to operate the variable rheostat and provided with two opposing independent series field windings, the improvement which comprises a contact arm pivotally mounted for movement between two spaced contact points in response to variations in the current flowing through the generator output circuit, means for adjusting the position of the contact arms intermediate and out of contact with the contact points at any predetermined constant current flowing through the generator output circuit, two sensitive relays adapted to be alternatively energized by contact between the contact arm and said contact points in response to variations in the current flow through the generator output circuit, the sensitive relays being energized by a source of alternating potential in series with a source of direct potential of sufficient magnitude to inhibit improper operation of the sensitive relays in response to alternations of the alternating potential, and two delayed-break relays each capable of effecting energization of one of said two independent motor field windings in response to energization of one of the sensitive relays, each of the delayed-break relays having a delayed break of sufficient magnitude to maintain energization of each of said motor field windings for a longer period of time than the energization of the corresponding sensitive relay, whereby smooth and uniform operation of the motor is obtained.

2. In a current regulating system for maintaining a substantially constant predetermined current in the output circuit of a direct-current generator comprising a variable rheostat in series in the generator field circuit, and an electric series-wound motor adapted to operate the variable rheostat and provided with two opposing independent series field windings, the improvement which comprises a contact arm pivotally mounted for movement between two spaced contact points in response to variations in the current flowing through the generator output circuit, means for adjusting the position of the contact arms intermediate and out of contact with the contact points at any predetermined constant current flowing through the generator output circuit, two sensitive relays adapted to be alternatively energized by contact between the contact arm and said contact points in response to variations in the current flow through the generator output circuit, and two delayed-break relays each capable of effecting energization of one of said two independent motor field windings, the delayed-break relays each having a coil energized by the establishment of an electrical contact in a circuit including said coil by energization of one of said sensitive relays, a condenser connected in parallel with the coil of each delayed-break relay, whereby arcing is minimized during breaking of the electrical contact in each of the delayed-break relay coil circuits, each of the delayed-break relays having a delayed break of sufficient magnitude to maintain energization of each of said motor field windings for a longer period of time than the energization of the corresponding sensitive relay, whereby smooth and uniform operation of the motor is obtained.

3. In a current regulating system for maintaining a substantially constant predetermined current in the output circuit of a direct-current generator comprising a variable rheostat in series in the generator field circuit, and an electric series-wound motor adapted to operate the variable rheostat and provided with two opposing independent series field windings, the improvement which comprises two delayed-break relays each adapted upon energization thereof to effect energization of said independent motor field windings, two sensitive relays each adapted to effect energization of one of said delayed-break relays, and means responsive to variations from a predetermined value in the current flowing through the generator output circuit for alternatively energizing said sensitive relays, each of the delayed-break relays having a delayed break of sufficient magnitude to maintain energization of each of said motor field windings for a longer period of time than the energization of the corresponding sensitive relay, whereby smooth and uniform operation of the motor is obtained.

WILLIAM CLAYTON NODDINGS.